United States Patent
Nishikawa et al.

(10) Patent No.: US 9,434,370 B2
(45) Date of Patent: Sep. 6, 2016

(54) CONTROL APPARATUS FOR A HYBRID VEHICLE DRIVE SYSTEM

(71) Applicant: TOYOTA JIDOSHA KABUSHIKI KAISHA, Toyota-shi, Aichi (JP)

(72) Inventors: Yukinobu Nishikawa, Anjo (JP); Yoshinori Morita, Toyota (JP); Shingo Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/690,707

(22) Filed: Apr. 20, 2015

(65) Prior Publication Data

US 2015/0321656 A1    Nov. 12, 2015

(30) Foreign Application Priority Data

May 7, 2014 (JP) .................. 2014-096394

(51) Int. Cl.

| | |
|---|---|
| *F16H 63/48* | (2006.01) |
| *B60W 10/02* | (2006.01) |
| *B60W 20/00* | (2016.01) |
| *B60K 6/445* | (2007.10) |
| *B60W 10/115* | (2012.01) |
| *B60W 10/18* | (2012.01) |
| *B60W 10/06* | (2006.01) |
| *B60W 10/08* | (2006.01) |
| *B60W 30/19* | (2012.01) |

(52) U.S. Cl.

CPC .............. *B60W 10/02* (2013.01); *B60K 6/445* (2013.01); *B60W 10/06* (2013.01); *B60W 10/08* (2013.01); *B60W 10/115* (2013.01); *B60W 10/18* (2013.01); *B60W 10/182* (2013.01); *B60W 20/00* (2013.01); *B60W 30/19* (2013.01); *F16H 63/483* (2013.01); *Y10S 903/93* (2013.01)

(58) Field of Classification Search
CPC .. F16H 63/48; F16H 63/483; B60W 10/115; B60W 10/182; B60K 6/445
See application file for complete search history.

(56) References Cited

U.S. PATENT DOCUMENTS

| | | | |
|---|---|---|---|
| 2008/0093137 | A1 | 4/2008 | Maeda et al. |
| 2009/0043465 | A1 | 2/2009 | Tomita |
| 2011/0111906 | A1 | 5/2011 | Kim et al. |
| 2015/0045179 | A1* | 2/2015 | Okuwaki .................. 477/5 |

FOREIGN PATENT DOCUMENTS

| | | |
|---|---|---|
| JP | 4215092 B2 | 1/2009 |
| JP | 2009-040296 A | 2/2009 |
| JP | 2009-166775 A | 7/2009 |
| JP | 2011-098712 | 5/2011 |
| JP | 2013-203383 | 10/2013 |
| JP | 2014-034239 A | 2/2014 |

* cited by examiner

*Primary Examiner* — Huan Le
(74) *Attorney, Agent, or Firm* — Oliff PLC

(57) ABSTRACT

Control apparatus for hybrid vehicle drive system including: first differential mechanism provided with a rotary element connected to engine and rotary element connected to a first electric motor; a second differential mechanism provided with a rotary element connected to second electric motor and a rotary element connected to output rotary member; first clutch configured to selectively connect rotary element of first differential mechanism connected to engine or first electric motor, to rotary element of second differential mechanism connected to output rotary member; manually operated shifting device; and parking lock mechanism provided with parking lock gear fixed directly or indirectly to output rotary member and rotary motion which is prevented when shifting device is placed in parking position, control apparatus including parking lock control portion configured to release parking lock gear for permitting rotary motion of parking lock gear while first clutch is placed in its engaged state.

4 Claims, 5 Drawing Sheets

|      | CL2 | BK2 |
|------|-----|-----|
| HV1  |     | ○   |
| HV2  | ○   |     |
| EV1  |     | ○   |
| EV2  | ○   | ○   |

|  | BK | CL | MODE |
|---|---|---|---|
| EV-1 | ○ |  | 1 |
| EV-2 | ○ | ○ | 2 |
| HV-1 | ○ |  | 3 |
| HV-2 |  | ○ | 4 |

CONTROL APPARATUS FOR A HYBRID VEHICLE DRIVE SYSTEM

CROSS REFERENCE TO RELATED APPLICATION

The present application claims the priority from Japanese Patent Application No. 2014-096394 filed on May 7, 2014, the disclosure of which is herein incorporated by reference in its entirety.

BACKGROUND OF THE INVENTION

1. Field of the Invention

The present invention relates to an improvement of a control apparatus for a drive system of a hybrid vehicle.

2. Description of Related Art

There is known a hybrid vehicle drive system including: a first differential mechanism provided with a rotary element connected to an engine and a rotary element connected to a first electric motor; a second differential mechanism provided with a rotary element connected to a second electric motor and a rotary element connected to an output rotary member; a first clutch configured to selectively connect the rotary element of the first differential mechanism connected to the engine, to the rotary elements of the second differential mechanism; a manually operated shifting device; and a parking lock mechanism provided with a parking lock gear which is fixed directly or indirectly to the output rotary member and a rotary motion of which is prevented when the shifting device is placed in a parking position. Regarding this hybrid vehicle drive system, there has been proposed a technique for reducing an impact torque transmitted to a rotor of the second electric motor when the parking lock mechanism is operated to release the parking lock gear. Patent Documents 1 and 2 disclose examples of a control apparatus for such a hybrid vehicle drive system.

According to the prior art technique described above, the impact torque is reduced by placing a brake in a slipping state when the parking lock mechanism is operated to release the parking lock gear. However, this prior art technique does not necessarily permit sufficient reduction of the impact torque transmitted to the second electric motor upon releasing of the parking lock gear, since an inertia of the second electric motor is comparatively large. A comparatively large impact torque applied to the second electric motor may deteriorate durability of the hybrid vehicle drive system. In view of this drawback, there has been a need for development of a control apparatus for a hybrid vehicle drive system, which control apparatus permits effective reduction of deterioration of durability of the hybrid vehicle drive system due to the impact torque generated upon releasing of the parking lock gear.

SUMMARY OF THE INVENTION

The present invention was made in view of the background art described above. It is therefore an object of the present invention to provide a control apparatus for a hybrid vehicle drive system, which control apparatus permits effective reduction of deterioration of durability of the hybrid vehicle drive system due to an impact torque generated upon releasing of a parking lock gear of its parking lock mechanism.

The object indicated above is achieved according to a first aspect of the present invention, which provides a control apparatus for a hybrid vehicle drive system including: a first differential mechanism provided with a rotary element connected to an engine and a rotary element connected to a first electric motor; a second differential mechanism provided with a rotary element connected to a second electric motor and a rotary element connected to an output rotary member; a first clutch configured to selectively connect the rotary element of the above-described first differential mechanism connected to the above-described engine or the above-described first electric motor, to a rotary element of the above-described second differential mechanism connected to the above-described output rotary member; a manually operated shifting device; and a parking lock mechanism provided with a parking lock gear which is fixed directly or indirectly to the output rotary member and a rotary motion of which is prevented when the shifting device is placed in a parking position, the control apparatus comprising a parking lock control portion configured to release the above-described parking lock gear for permitting the rotary motion of the parking lock gear while the above-described first clutch is placed in its engaged state.

In the control apparatus according to the first aspect of the invention described above, the parking lock control portion is configured to release the parking lock gear for permitting the rotary motion of the parking lock gear while the first clutch is placed in its engaged state, whereby an impact torque generated upon releasing of the parking lock gear is transmitted to the first differential mechanism, the engine, the first electric motor, etc., as well as to the second electric motor, so that an amount of the impact torque transmitted to the second electric motor can be effectively reduced. Namely, the first aspect of the present invention provides a control apparatus for a hybrid vehicle drive system, which permits effective reduction of deterioration of durability of the hybrid vehicle drive system due to the impact torque generated upon releasing of the parking lock gear of its parking lock mechanism.

According to a second aspect of the invention, the hybrid vehicle drive system to be controlled by the control apparatus according to the first aspect of the invention further includes a second clutch which is placed in its engaged state to hold constant a ratio of an output speed of the above-described first differential mechanism to a speed of a rotary motion received by the first differential mechanism from the above-described engine, and the above-described parking lock control portion releases the above-described parking lock gear for permitting the rotary motion of the parking lock gear while the above-described second clutch is placed in its engaged state. According to this second aspect of the invention, the impact torque generated upon releasing of the parking lock gear can be efficiently transmitted to the first differential mechanism, the engine, the first electric motor, etc., as well as to the second electric motor.

According to a third aspect of the invention, the hybrid vehicle drive system to be controlled by the control apparatus according to the first or second aspect of the invention further includes a brake configured to selectively connect a rotary element of the above-described first differential mechanism connected to the above-described first electric motor or a rotary element of the above-described second differential mechanism connected to the above-described output rotary member to a stationary member, and the above-described parking lock control portion releases the above-described parking lock gear for permitting the rotary motion of the parking lock gear while the above-described brake is placed in its engaged state. According to this third aspect of the invention, the impact torque generated upon releasing of the parking lock gear can be efficiently transmitted to the first differential mechanism, the engine, the first electric motor, etc., as well as to the second electric motor.

DETAILED DESCRIPTION OF PREFERRED EMBODIMENTS

Figure 1:
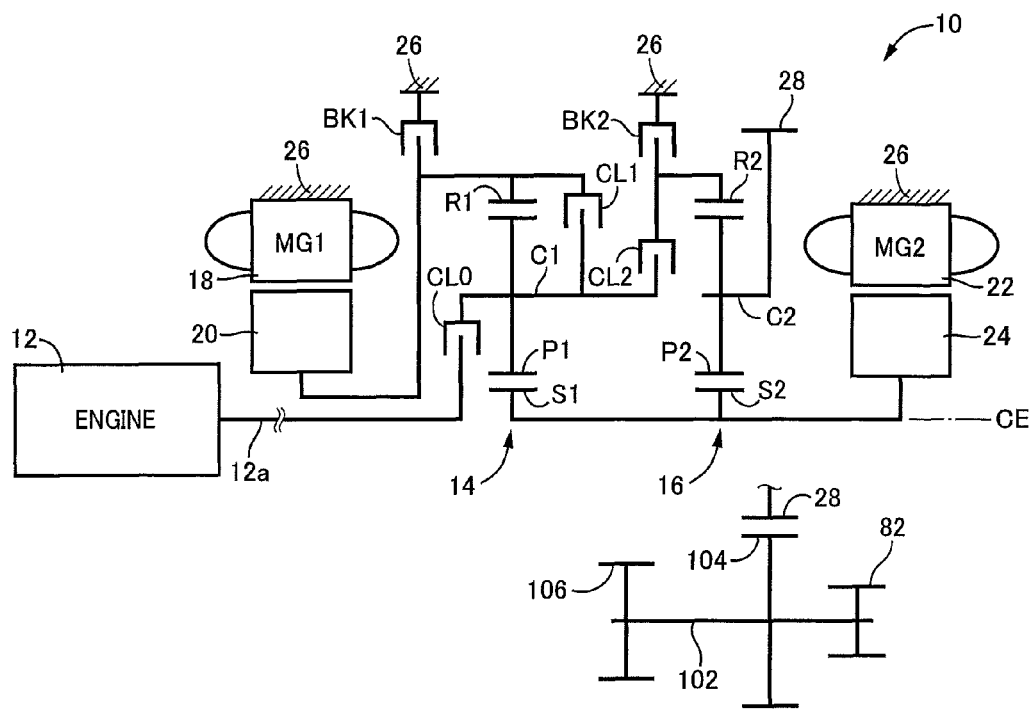
FIG. 1 is a schematic view showing an example of an arrangement of a hybrid vehicle drive system to which the present invention is suitably applicable.

Preferably, a differential device which includes the above-described first and second differential mechanisms and to which the present invention is applicable includes four rotary components when the above-described first clutch is placed in the engaged state. The differential device may further include another clutch disposed between the selected rotary elements, in addition to the clutch indicated above. The differential device may include a further clutch disposed between an output shaft of the engine and the selected rotary element of the first differential mechanism.

In a preferred arrangement of the hybrid vehicle drive system to which the present invention is applicable, the first differential mechanism is provided with a first rotary element, a second rotary element and a third rotary element, and the second differential mechanism is provided with a first rotary element, a second rotary element and a third rotary element. The first electric motor is connected to the first rotary element of the first differential mechanism, and the engine is connected to the second rotary element of the first differential mechanism, while the third rotary element of the first differential mechanism and the third rotary element of the second differential mechanism are connected to each other. The output rotary member is connected to the second rotary element of the second differential mechanism, and the second electric motor is connected to the third rotary element of the second differential mechanism, while the first clutch is configured to selectively connect the second rotary element of the first differential mechanism and the first rotary element of the second differential mechanism. The second clutch is configured to selectively connect the first and second rotary elements of the first differential mechanism to each other, and the brake is configured to selectively connect the first rotary element of the first differential mechanism or the first rotary element of the second differential mechanism to a stationary member.

Referring to the drawings, preferred embodiments of the present invention will be described in detail. It is to be understood that the drawings referred to below do not necessarily accurately represent ratios of dimensions of various elements.

First Embodiment

Figures 7, 8:
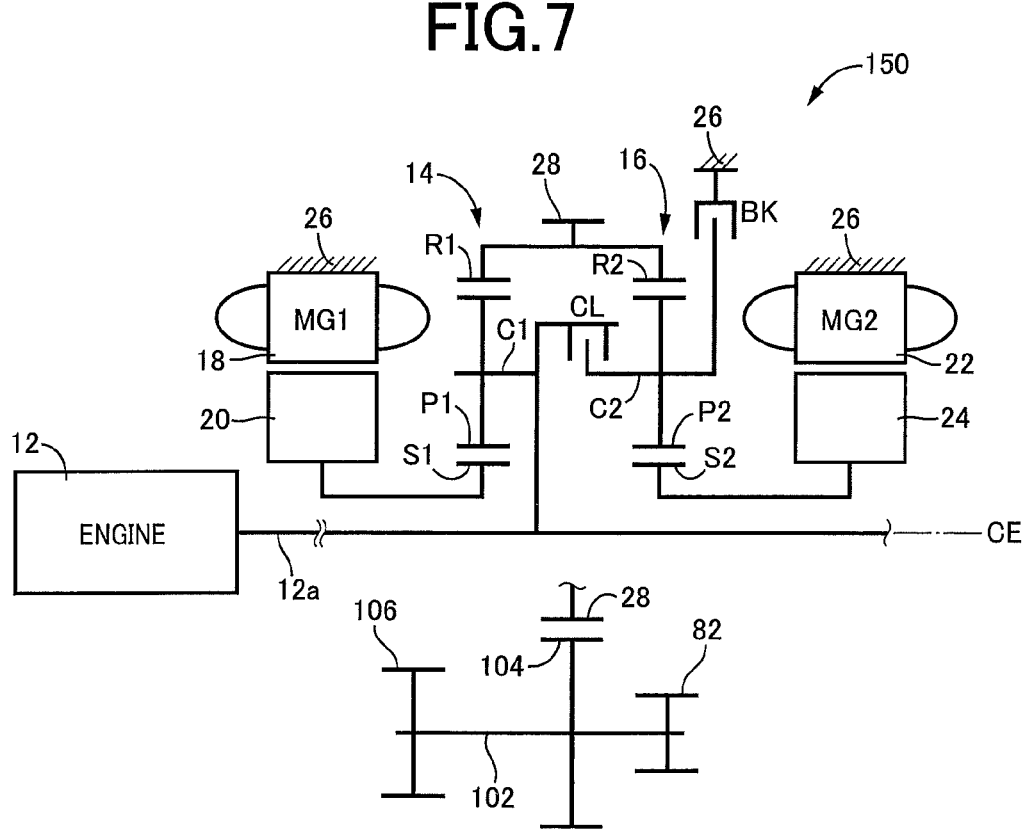
FIG. 7 is a schematic view showing an example of another arrangement of the hybrid vehicle drive system to which the present invention is suitably applicable.
FIG. 8 is a table indicating combinations of operating states of a clutch and a brake, which correspond to respective four vehicle drive modes to be established in the drive system of FIG. 7.

FIG. 1 is the schematic view showing an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common axis CE. In the following description of the embodiments, the direction of extension of this axis CE will be referred to as an "axial direction". The drive system 10 is constructed substantially symmetrically with respect to the axis CE. In FIG. 1, a lower half of the drive system 10 is not shown. This is also true in FIG. 7 showing a second embodiment of the invention.

The engine 12 is an internal combustion engine such as a gasoline engine, which is operable to generate a drive force by combustion of a fuel such as a gasoline injected into its cylinders. Each of the first and second electric motors MG1 and MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio $\rho 1$ and which includes rotary elements consisting of: a first rotary element in the form of a ring gear R1; a second rotary element in the form of a carrier C1 supporting a pinion gear P1 such that the pinion gear P1 is rotatable about its axis and the axis of the planetary gear set; and a third rotary element in the form of a sun gear S1 meshing with the ring gear R1 through the pinion gear P1. The second planetary gear set 16 is a single-pinion type planetary gear set which has a gear ratio $\rho 2$ and which includes rotary elements consisting of: a first rotary element in the form of a ring gear R2; a second rotary element in the form of a carrier C2 supporting a pinion gear P2 such that the pinion gear P2 is rotatable about its axis and the axis of the planetary gear set; and a third rotary element in the form of a sun gear S2 meshing with the ring gear R2 through the pinion gear P2.

In the first planetary gear set 14, the ring gear R1 is fixed to the rotor 20 of the first electric motor MG1, and the carrier C1 is selectively connectable through a clutch CL0 to an output shaft of the engine 12 in the form of a crankshaft 12a, while the sun gear S1 is fixed to the sun gear S2 of the second planetary gear set 16 and the rotor 24 of the second electric motor MG2. In the second planetary gear set 16, the carrier C2 is fixed to an output rotary member in the form of an output gear 28. A drive force received by the output gear 28 is transmitted to a pair of right and left drive wheels (not shown) through a differential gear device and axles (not shown). A torque received by the drive wheels from a roadway surface during running of the hybrid vehicle is transmitted from the output gear 28 to the drive system 10 through the differential gear device and axles.

The clutch CL0 for selectively connecting and disconnecting the carrier C1 of the first planetary gear set 14 to and from the crankshaft 12a of the engine 12 is disposed between the crankshaft 12a and the carrier C1. A clutch CL1 for selectively connecting and disconnecting the carrier C1 to and from the ring gear R1 is disposed between the carrier C1 and the ring gear R1. A clutch CL2 for selectively connecting and disconnecting the carrier C1 to and from the ring gear R2 of the second planetary gear set 16 is disposed between the carrier C1 and the ring gear R2. A brake BK1 for selectively fixing the ring gear R1 to the stationary member in the form of the housing 26 is disposed between the ring gear R1 and the housing 26. A brake BK2 for selectively fixing the ring gear R2 to the housing 26 is disposed between the ring gear R2 and the housing 26.

In the drive system 10, the differential device including the first and second planetary gear sets 14 and 16 has four rotary components when the clutch CL2 is placed in the engaged state. In other words, the drive system 10 is provided with: the differential device (14, 16); and the engine 12, the first electric motor MG1, the second electric motor MG2 and the output gear 28, which are respectively connected to the four rotary components of the differential device. Relative rotating speeds of the four rotary components are represented by a collinear chart in the form of a two-dimensional coordinate system in which gear ratios of the first and second planetary gear sets 14 and 16 are taken along a horizontal axis, while the relative rotating speeds of the four rotary components are taken along a vertical axis. One of the four rotary components is constituted by the carrier C1 of the first planetary gear set 14 and the ring gear R2 of the second planetary gear set 16, which are selectively connected to each other through the clutch CL2, and the ring gear R2 selectively connected to the carrier C1 is selectively fixed to the housing 26 through the brake BK2.

In the present embodiment, the clutch CL2 functions as a first clutch configured to selectively connect the second rotary element of the first planetary gear set 14 in the form of the carrier C1 (connected to the engine 12) and the first rotary element of the second planetary gear set 16 in the form of the ring gear R2 to each other, and the brake BK1 functions as a brake configured to selectively connect the first rotary element of the first planetary gear set 14 in the form of the ring gear R1 to the stationary member in the form of the housing 26, while the brake BK2 functions as a brake configured to selectively connect the first rotary element of the second planetary gear set 16 in the form of the ring gear R2 to the stationary member in the form of the housing 26.

In the drive system 10 constructed as described above, the carrier C1 and the ring gear R1 of the first planetary gear set 14 are connected to each other through the clutch CL1 placed in the engaged state, so that the rotary elements of the first planetary gear set 14 are rotated as a unit by a rotary motion received from the engine 12, such that a ratio of an output speed of the first planetary gear set 14 to a speed of the rotary motion received from the engine 12 is held constant. That is, the clutch CL1 functions as a second clutch configured to hold constant the ratio of the output speed of the first planetary gear set 14 to the speed of the rotary motion received by the first planetary gear set 14 from the engine 12.

The drive system 10 need not be provided with the clutch CL0. That is, in the absence of the clutch CL0, the crankshaft 12a of the engine 12 may be directly fixed to the carrier C1 of the first planetary gear set 14, or indirectly through a damper, for instance. Further, the drive system 10 need not be provided with the clutch CL1 and the brake BK1. That is, a control apparatus in the form of an electronic control device 30 is applicable to the drive system 10 which is provided with at least the first clutch in the form of the clutch CL2.

Each of the clutches CL0, CL1 and CL2 and the brakes BK1 and BK2 is preferably a hydraulically operated coupling device the operating state of which is controlled (which is engaged and released) according to a hydraulic pressure applied thereto from a hydraulic control unit 54. While wet multiple-disc type frictional coupling devices are preferably used as the clutches CL and brakes BK, meshing type coupling devices, namely, so-called dog clutches (claw clutches) may also be used. Alternatively, the clutches CL and brakes BK may be electromagnetic clutches, magnetic powder clutches and any other clutches the operating states of which are controlled (which are engaged and released) according to electric commands generated from the electronic control device 30.

Figure 2:
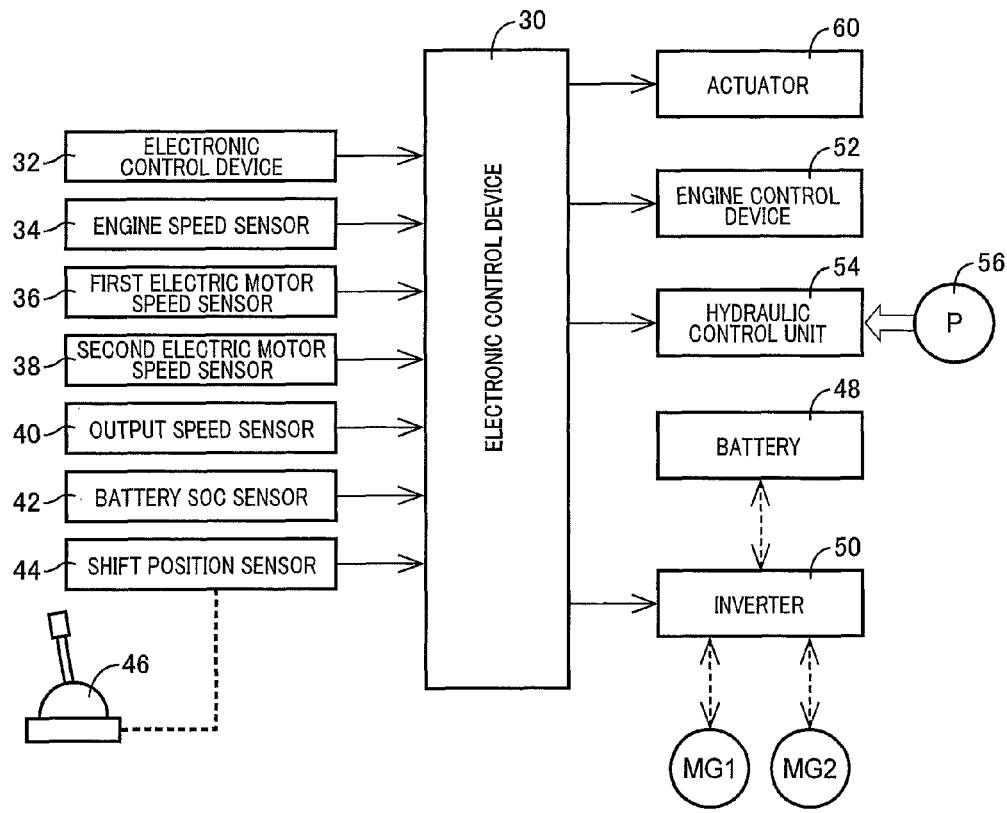
FIG. 2 is a block diagram illustrating major portions of a control system provided to control the drive system of FIG. 1.

FIG. 2 is the block diagram illustrating major portions of a control system provided to control the drive system 10. The electronic control device 30 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first and second electric motors MG1 and MG2. In the present embodiment, the electronic control device 30 serves as a control apparatus for the drive system 10. The electronic control device 30 may be constituted by mutually independent control units as needed for respective controls such as an output control of the engine 12 and drive controls of the first and second electric motors MG1 and MG2. For instance, the electronic control device 30 may include a control unit which is provided for controlling a shift switching device 58 (described below), independently of the control units for the output control of the engine 12 and the drive controls of the first and second electric motors MG1 and MG2.

As indicated in FIG. 2, the electronic control device 30 is configured to receive various signals from sensors and switches provided in the drive system 10. Namely, the electronic control device 30 receives: an output signal of an accelerator pedal operation amount sensor 32 indicative of an operation amount or angle $A_{CC}$ of an accelerator pedal (not shown), which corresponds to a vehicle output required by a vehicle operator; an output signal of an engine speed sensor 34 indicative of an engine speed $N_E$, that is, an operating speed of the engine 12; an output signal of a first electric motor speed sensor 36 indicative of an operating speed $N_{MG1}$ of the first electric motor MG1; an output signal of a second electric motor speed sensor 38 indicative of an operating speed $N_{MG2}$ of the second electric motor MG2; an output signal of a running speed detector in the form of an output speed sensor 40 indicative of a rotating speed $N_{OUT}$ of the output gear 28, which corresponds to a running speed V of the hybrid vehicle; an output signal of a battery SOC sensor 42 indicative of an electric energy amount SOC stored in a battery 48 (a state of charge SOC of the battery 48); and an output signal of a shift position sensor 44 indicative of a selected shift position $P_S$ of a manually operated shifting device 46.

The electronic control device 30 is also configured to generate various control commands to be applied to various portions of the drive system 10. Namely, the electronic control device 30 applies, to an engine control device 52, engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 30 applies command signals to an inverter 50, for controlling operations of the first and second electric motors MG1 and MG2, so that the first and second electric motors MG1 and MG2 are operated with electric energies supplied thereto from the battery 48 through the inverter 50 according to the command signals to control outputs (output torques) of the electric motors MG1 and MG2. Electric energies generated by the first and second electric motors MG1 and MG2 are supplied to and stored in the battery 48 through the inverter 50. Further, the electronic control device 30 applies command signals for controlling the operating states of the clutches CL1, CL2, etc. and the brakes BK1 and BK2, to linear solenoid valves and other electromagnetic control valves provided in the hydraulic control unit 54, so that hydraulic pressures generated by those electromagnetic control valves are controlled to control the operating states of the clutches CL1, CL2, etc. and brakes BK1 and BK2. The drive system 10 is preferably provided with an electrically operated oil pump 56 for delivering a pressurized oil to the hydraulic control unit 54. The oil pump 56 is controlled according to a command signal generated by the electronic control device 30.

Figure 3:
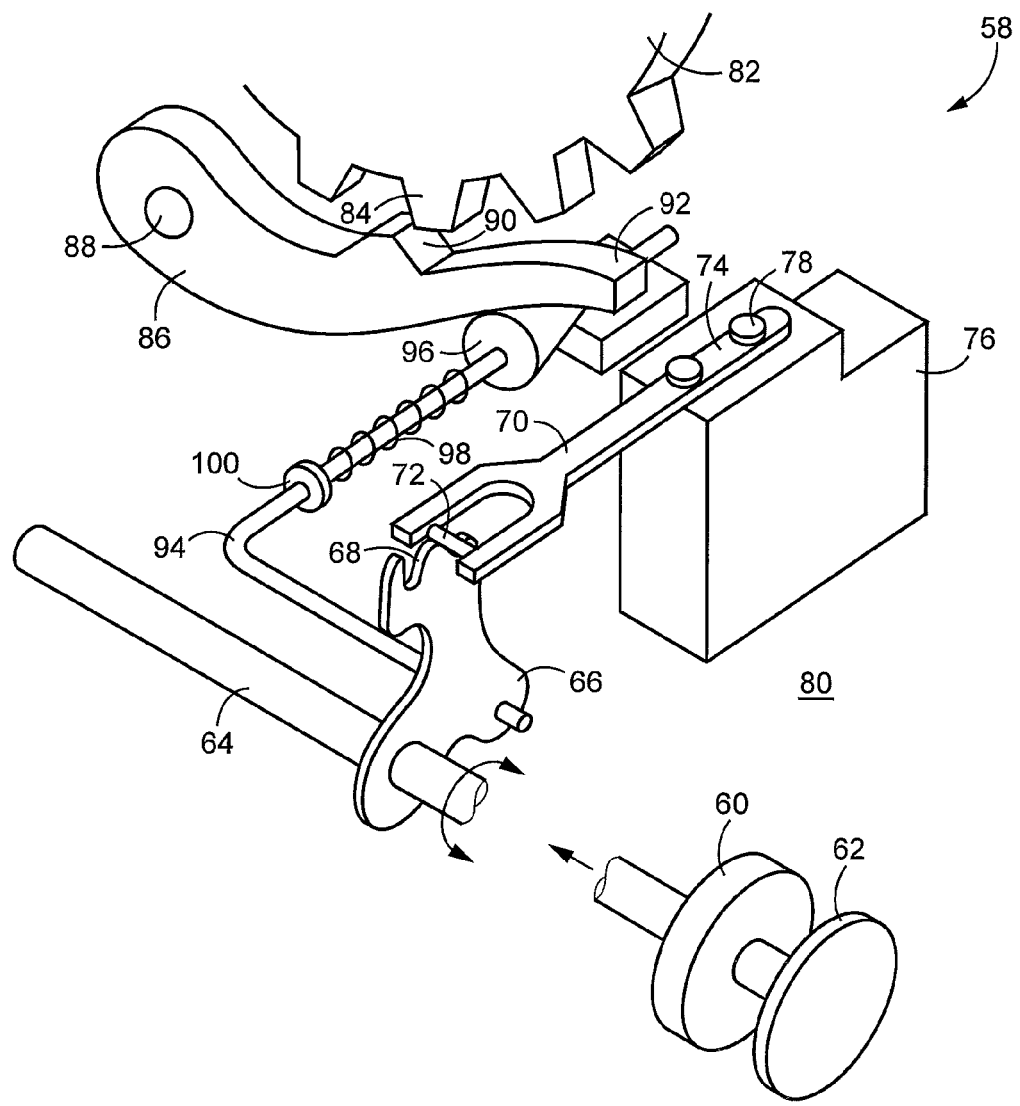
FIG. 3 is a perspective view showing an arrangement of a shift switching device provided in the drive system of FIG. 1.

FIG. 3 is the perspective view showing an arrangement of the above-indicated shift switching device 58 provided in the drive system 10. As shown in FIG. 3, the shift switching device 58 includes: a shaft member 64 rotated by an actuator 60; a detent member 66 which is fixed to a predetermined axial portion of the shaft member 64 in a non-rotatable manner such that the detent member 66 is pivoted about an axis of the shaft member 64 together with the shaft member 64, and which has a cam surface 68 formed along its periphery and provided with a first recess and a second recess respectively defining a parking-lock position and a non-parking-lock position; and an engaging member 70 in the form of an elongate spring sheet which is provided at its respective opposite end portions with an engaging portion 72 held in pressing contact with the cam surface 68 of the detent member 66 by a biasing force, for selective engagement with the first and second recesses, and a fixing portion 74 at which the engaging member 70 is fixed to a fixing member 76 by fasteners 78 such as screws. A body of the actuator 60, and the fixing member 76 are fixed to a housing 80. The detent member 66 may also be called a "detent plate", "parking lever" or "detent lever", for example, while the engaging member 70 may also be called a "detent spring", for example.

As shown in FIG. 1, the drive system 10 is provided with: a counter shaft 102 disposed in a power transmitting path between the output gear 28 and drive wheels (not shown); and a counter driven gear 104, a final drive gear 106 and a parking lock gear 82 which are fixed integrally to the counter shaft 102 such that the counter driven gear 104, final drive gear 106 and parking lock gear 82 are coaxial with the counter shaft 102. Preferably, the parking lock gear 82 is fixed to one of opposite axial ends of the counter shaft 102. The counter driven gear 104 is held in meshing engagement with the output gear 28, so that a drive force is transmitted from the output gear 28 to the drive wheels through the counter driven gear 104, counter shaft 102, final drive gear 106, etc.

Referring back to FIG. 3, the shift switching device 58 further includes a parking lock pawl (engaging pawl member) 86 in the form of an elongate lever which is pivotable between a parking-lock position in which the parking lock pawl engages external teeth 84 of the parking lock gear 82, and a non-parking-lock position. This parking lock pawl 86 is supported by the housing 80 such that the parking lock pawl 86 is pivotable about a pin 88 located at its proximal end. The parking lock pawl 86 has an engaging tooth 90 formed in its longitudinally intermediate portion, for engagement with the external teeth 84, and a sliding portion 92 formed in its distal or free end portion, for engagement with a parking lock cam 96. The parking lock pawl 86 is normally held by a return spring (not shown) in the non-parking-lock position in which the engaging tooth 90 is not in engagement with the external teeth 84.

The parking lock cam 96 is fixed to a distal or free end portion of an L-shaped parking rod 94 which is pivotably connected at its proximal end portion to the detent member 66, so that the parking lock cam 96 is axially movable by the parking rod 94. The parking lock cam 96 has a tapered cam surface, and is biased toward a stopper (not shown), with a preset preloading force generated by a pre-loading spring 98 in the form of a coil disposed between the parking lock cam 96 and a spring seat 100 fixed to a predetermined longitudinal part of the distal end portion of the parking rod 94. The parking rod 94 is supported such that the distal end portion is movable in its longitudinal direction (in a direction perpendicular to the axis about which the parking rod 94 is pivotably connected to the detent member 66), so that the parking lock cam 96 is movable in sliding contact with the sliding portion 92 of the parking lock pawl 86.

The engaging member 70 is preferably an elongate sheet spring, so that the engaging portion 72 provided at the distal end of the engaging member 70 is normally held in pressing contact with the cam surface 68 of the detent member 66 with a predetermined biasing force of the sheet spring. The engaging portion 72 takes the form of a roller supported at the distal end of the engaging member 70 pivotably about an axis parallel to the axis of pivoting of the detent member 66. In this arrangement, the detent member 66 is held in the parking-lock position with the engaging portion 72 held in engagement with the first recess, and in the non-parking-lock position with the engaging portion 72 held in engagement with the second recess.

In the non-parking-lock position of the detent member 66, the engaging tooth 90 of the parking lock pawl 86 is not in engagement with the external teeth 84 of the parking lock gear 82. In this non-parking-lock position, a rotary motion of the parking lock gear 82 is not prevented by the parking lock pawl 86. In the parking-lock position of the detent member 66, the engaging tooth 90 of the parking lock pawl 86 is held in engagement with the external teeth 84 of the parking lock gear 82. In this parking-lock position, the shift switching device 58 is placed in a parking lock state in which the rotary motion of the parking lock gear 82 is prevented by the parking lock pawl 86. Namely, rotary motions of the drive wheels (not shown) indirectly connected to the parking lock gear 82 are prevented.

The electronic control device 30 controls an operation of the actuator 60, on the basis of an output signal of an encoder 62 provided to detect a rotary position of the actuator 60, to perform a shift switching control of the shift switching device 58 for selectively placing the drive system 10 in a parking position and non-parking positions. The actuator 60 is constituted by an electric motor such as a switched reluctance motor (SRM), for instance, and functions to actuate the shift switching device 58 according to command signals received from the electronic control device 30. The encoder 62 is rotated together with a rotary member of the actuator 60, and supplies the electronic control device 30 with the output signal indicative of the rotary position of the actuator 60. Preferably, the encoder 62 is a rotary encoder configured to generate A-phase, B-phase and Z-phase signals.

The electronic control device 30 controls the operation of the actuator 60 in a feedback fashion on the basis of the output signal of the encoder 62 indicative of the rotary position of the actuator 60. When the selection of the parking position of the manually operated shifting device 46 is detected by the shift position sensor 44, for instance, the electronic control device 30 controls the actuator 60 so as to place the detent member 66 in its parking lock position. Namely, the shift switching device 58 functions as a parking lock mechanism configured to prevent the rotary motion of the parking lock gear 82 connected indirectly to the output gear 28, when the shifting device 46 is operated to the parking position.

An operating state of the drive system 10 is controlled through the first and second electric motors MG1 and MG2, such that the drive system 10 functions as an electrically controlled differential portion whose difference of input and output speeds is controllable. For example, an electric energy generated by the first electric motor MG1 is supplied to the battery 48 or the second electric motor MG2 through the inverter 50. Namely, a major portion of the drive force of the engine 12 is mechanically transmitted to the output gear 28, while the remaining portion of the drive force is consumed by the first electric motor MG1 operating as the electric generator, and converted into the electric energy, which is supplied to the second electric motor MG2 through the inverter 50, so that the second electric motor MG2 is operated to generate a drive force to be transmitted to the output gear 28. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 4, 5:
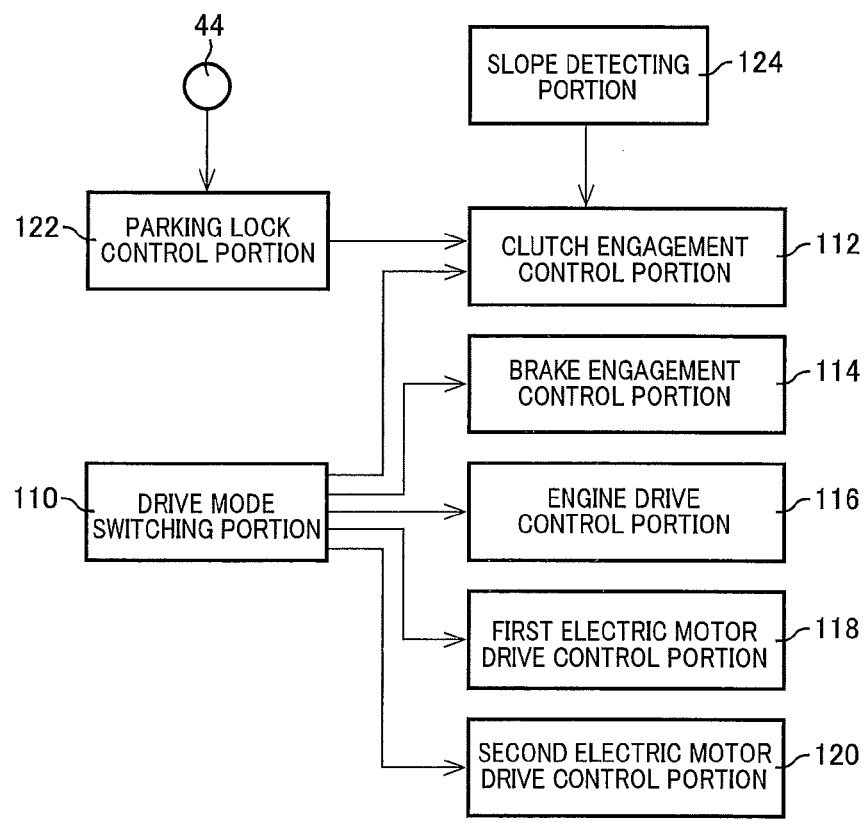
FIG. 4 is a table indicating combinations of operating states of a clutch and a brake, which correspond to respective four vehicle drive modes to be established in the drive system of FIG. 1.
FIG. 5 is a functional block diagram illustrating major control functions of an electronic control device shown in FIG. 2.

In the hybrid vehicle provided with the drive system 10 constructed as described above, a selected one of a plurality of vehicle drive modes is established according to the operating states of the engine 12 and the first and second electric motors MG1 and MG2, and the operating states of the clutches CL1, CL2, etc. and brakes BK1 and BK2. FIG. 4 is the table indicating combinations of the operating states of the clutch CL2 and brake BK2, which correspond to the respective four vehicle drive modes of the drive system 10. In this table, "o" marks represent the engaged states of the clutch CL2 and brake BK2 while blanks represent their released states. Drive modes HV1 and HV2 indicated in FIG. 4 are hybrid drive modes in which the engine 12 is operated as the vehicle drive power source while the first and second electric motors MG1 and MG2 are operated as needed to generate a vehicle drive force and/or an electric energy. In these hybrid drive modes, at least one of the first and second electric motors MG1 and MG2 can be operated to generate a reaction force or placed in a non-loaded free state. Drive modes EV1 and EV2 indicated in FIG. 4 are EV drive modes in which the engine 12 is held at rest while at least one of the first and second electric motors MG1 and MG2 is used as a vehicle drive power source.

While the drive system 10 in the present embodiment is placed in one of the four different drive modes as indicated in FIG. 4, the drive system 10 may be configured to be placed in a selected one of a plurality of constant-speed-ratio drive modes, according to a selected one of different combinations of the operating states of the clutch CL1 and the brake BK1, for instance. In the constant-speed-ratio drive modes, the drive system 10 has respective different speed values of a speed ratio of a power transmitting path from the engine 12 to the output gear 28. Namely, the clutch CL1 and the brake BK1 provided in the drive system 10 are placed in the engaged or released state as needed depending upon the running state of the hybrid vehicle provided with the drive system 10. The following description of the plurality of drive modes corresponding to the respective combinations of the operating states of the clutch CL2 and brake BK2 is based on an assumption that the clutch CL1 and brake BK1 are both placed in the released states.

In the drive mode HV1 indicated in FIG. 4, the carrier C1 of the first planetary gear set 14 and the ring gear R2 of the second planetary gear set 16 are rotatable relative to each other in the released state of the clutch CL2, while the ring gear R2 is fixed to the stationary member in the form of the housing 26 in the engaged state of the brake BK2, so that the rotating speed of the ring gear R2 is held at zero. In this drive mode HV1, the engine 12 is operated so that the output gear 28 is rotated by an output torque of the engine 12. At this time, the first electric motor MG1 generates a reaction torque in the first planetary gear set 14, to enable the output of the engine 12 to be transmitted to the output gear 28. In the second planetary gear set 16, the carrier C2, that is, the output gear 28 is rotated in a positive direction by an output torque of the second electric motor MG2 if generated in a positive direction in the engaged state of the brake BK2.

In the drive mode HV2 indicated in FIG. 4, the carrier C1 of the first planetary gear set 14 and the ring gear R2 of the second planetary gear set 16 are not rotatable relative to each other in the engaged state of the clutch CL2, that is, the carrier C1 and the ring gear R2 are rotated as a single rotary component. The sun gear S1 and the sun gear S2 are fixed to each other, and are rotated as a single rotary component. Namely, when the drive system 10 is placed in the drive mode HV2, the differential device consisting of the first and second planetary gear sets 14 and 16 has four rotary components: the ring gear R1 (fixed to the first electric motor MG1); a rotary component constituted by the carrier C1 and the ring gear R2 which are connected to each other (and to the engine 12); the carrier C2 (fixed to the output gear 28); and a rotary component constituted by the sun gears S1 and S2 which are fixed to each other (and to the second electric motor MG2).

In the drive mode HV2, the carrier C1 of the first planetary gear set 14 and the ring gear R2 of the second planetary gear set 16 are connected to each other through the clutch CL2 placed in the engaged state, and are rotated as a single rotary component, so that any of the first and second electric motors MG1 and MG2 can receive a reaction force in response to the engine output. Namely, either one or both of the first and second electric motors MG1 and MG2 can be assigned to receive the reaction force during engine operation, making it possible to operate the drive system 10 with a high degree of operating efficiency, and to permit the hybrid vehicle to run with reduced torque limitation due to heat generation.

In the drive mode EV1 indicated in FIG. 4, the carrier C1 of the first planetary gear set 14 and the ring gear R2 of the second planetary gear set 16 are rotatable relative to each other in the released state of the clutch CL2, while the ring gear R2 is fixed to the stationary member in the form of the housing 26 in the engaged state of the brake BK2, so that the rotating speed of the ring gear R2 is held at zero. In this drive mode EV1, the carrier C2 in the second planetary gear set 16, that is, the output gear 28 is rotated in the positive direction by the output torque of the second electric motor MG2 if generated in the positive direction. That is, the hybrid vehicle provided with the drive system 10 can be driven in the forward direction by the positive torque generated by the second electric motor MG2. When the second electric motor MG2 is operated, the first electric motor MG1 is preferably placed in a free state.

In the drive mode EV2 indicated in FIG. 4, the carrier C1 of the first planetary gear set 14 and the ring gear R2 of the second planetary gear set 16 are not rotatable relative to each other in the engaged state of the clutch CL2, while the ring gear R2 and the carrier C1 of the first planetary gear set 14 which is fixed to the ring gear R2 are fixed to the stationary member in the form of the housing 26 by further placing the brake BK2 in the engaged state, so that the rotating speed of the ring gear R2 and the carrier C1 is held at zero. In this drive mode EV2, the rotating directions of the ring gear R1 and the sun gear S1 in the first planetary gear set 14 are opposite to each other. Namely, the carrier C2, that is, the output gear 28 is rotated in a positive direction by a negative torque generated by the first electric motor MG1, and by a positive torque generated by the second electric motor MG2. That is, the hybrid vehicle provided with the drive system 10 can be driven in the forward direction by an output torque or output torques of at least one of the first and second electric motors MG1 and MG2.

In the drive mode EV2, at least one of the first and second electric motors MG1 and MG2 may be operated as an electric generator. In this case, one or both of the first and second electric motors MG1 and MG2 can be assigned to generate a vehicle drive force (torque), with a high degree of operating efficiency, permitting the hybrid vehicle to run with reduced torque limitation due to heat generation. Further, at least one of the first and second electric motors MG1 and MG2 may be held in a free state, when the generation of an electric energy by a regenerative operation of the electric motors MG1 and MG2 is inhibited in a fully charged state of the battery 48. Namely, the drive mode EV2 can be established under various running conditions of the hybrid vehicle, or may be kept for a relatively long length of time. Accordingly, the drive mode EV2 is advantageously provided on a hybrid vehicle such as a plug-in hybrid vehicle, which is frequently placed in an EV drive mode.

FIG. 5 is the functional block diagram illustrating major control functions of the electronic control device 30. A drive mode switching portion 110 shown in FIG. 5 is configured to determine the drive mode of the drive system 10 that should be established. Described more specifically, the drive mode switching portion 110 selects one of the four drive modes indicated in FIG. 4, that is, the drive modes HV1, HV2, EV1 and EV2, on the basis of the accelerator pedal operation amount $A_{CC}$ detected by the accelerator pedal operation amount sensor 32, the vehicle running speed V corresponding to the output speed detected by the output speed sensor 40, the stored electric energy amount SOC of the battery 48 detected by the battery SOC sensor 42, etc., and according to a predetermined drive mode switching map.

The drive mode switching portion 110 establishes the selected one of the plurality of drive modes indicated in FIG. 4 according to the result of the determination: the hybrid drive modes HV1 and HV2 in which the output torque of the engine 12 and the output torque or torques of at least one of the first and second electric motors MG1 and MG2 are transmitted to the output gear 28; the EV drive mode EV1 in which the output torque of the second electric motor MG2 is transmitted to the output gear 28; and the EV drive mode EV2 in which the output torques of the first and second electric motors MG1 and MG2 are transmitted to the output gear 28.

A clutch engagement control portion 112 is configured to control the operating states of the clutches CL1, CL2, etc. through the hydraulic control unit 54. Described more specifically, the clutch engagement control portion 112 controls output hydraulic pressures of solenoid control valves provided in the hydraulic control unit 54 to control the clutches CL1, CL2, etc., for controlling the hydraulic pressure $P_{CL1}$, $P_{CL2}$, etc. which determine the operating states (torque capacities) of the clutches CL1, CL2, etc. The clutch engagement control portion 112 is preferably configured to control the operating states, i.e., the torque capacities of the clutches CL1, CL2, etc. according to the drive mode selected by the drive mode switching portion 110. Namely, the clutch engagement control portion 112 is basically configured to control the torque capacities of the clutches CL1 and CL2, so as to place the clutch CL1 in the released state and to place the clutch CL2 in the engaged state when the drive mode switching portion 110 has determined that the drive system 10 should be switched to the drive mode HV2 or EV2, and so as to place both of the clutches CL1 and CL2 in the released state when the drive mode switching portion 110 has determined that the drive system 10 should be switched to the drive mode HV1 or EV1.

A brake engagement control portion 114 is configured to control the operating states of the brakes BK1 and BK2 through the hydraulic control unit 54. Described more specifically, the brake engagement control portion 114 controls output hydraulic pressures of solenoid control valves provided in the hydraulic control unit 54 to control the brakes BK1 and BK2, for controlling the hydraulic pressures PBK1 and PBK2 which determine the operating states (torque capacities) of the brakes BK1 and BK2. The brake engagement control portion 114 is preferably configured to control the operating states, i.e., the torque capacities of the brakes BK1 and BK2, according to the drive mode selected by the drive mode switching portion 110. Namely, the brake engagement control portion 114 is basically configured to control the torque capacities of the brakes BK1 and BK2, so as to place the brake BK1 in the released state and to place the brake BK2 in the engaged state when the drive mode switching portion 110 has determined that the drive system 10 should be switched to the drive mode HV1, EV1 or EV2, and so as to place both of the brakes BK1 and BK2 in the released state when the drive mode switching portion 110 has determined that the drive system 10 should be switched to the drive mode HV2.

An engine drive control portion 116 is configured to control an operation of the engine 12 through the engine control device 52. For instance, the engine drive control portion 116 commands the engine control device 52 to control an amount of supply of a fuel by the fuel injecting device of the engine 12 into an intake pipe, a timing of ignition (ignition timing) of the engine 12 by the igniting device, and the opening angle $\theta_{TH}$ of the electronic throttle valve, so that the engine 12 generates a required output, that is, a target torque (target engine output).

A first electric motor drive control portion 118 is configured to control an operation of the first electric motor MG1 through the inverter 50. For example, the first electric motor drive control portion 118 controls an amount of an electric energy to be supplied from the battery 48 to the first electric motor MG1 through the inverter 50, so that the first electric motor MG1 generates a required output, that is, a target torque (target MG1 output). A second electric motor drive control portion 120 is configured to control an operation of the second electric motor MG2 through the inverter 50. For example, the second electric motor drive control portion 120 controls an amount of an electric energy to be supplied from the battery 48 to the second electric motor MG2 through the inverter 50, so that the second electric motor MG2 generates a required output, that is, a target torque (target MG2 output).

In the hybrid drive modes in which the engine 12 is operated while the first and second electric motors MG1 and MG2 are used as the vehicle drive power source, a vehicle drive force required to be generated by the drive system 10 (output gear 28) to drive the hybrid vehicle is calculated on the basis of the accelerator pedal operation amount $A_{CC}$ detected by the accelerator pedal operation amount sensor 32, and the vehicle running speed V corresponding to the output speed $N_{OUT}$ detected by the output speed sensor 40. The operations of the first and second electric motors MG1 and MG2 are controlled by the first and second electric motor drive control portions 118 and 120, while the operation of the engine 12 is controlled by the engine drive control portion 116, so that the calculated required vehicle drive force is obtained by the output torque of the engine 12 and the output torques of the first and second electric motors MG1 and MG2.

A parking lock control portion 122 is configured to control an operation of the parking lock mechanism in the form of the shift switching device 58 according to the presently selected shift position of the manually operated shifting device 46. The parking lock control portion 122 is basically configured to control an operation of the actuator 60 for controlling an angular position of the detent member 66 according to the output signal of the shift position sensor 44 indicative of the selected shift position $P_S$ of the shifting device 46. Namely, the parking lock control portion 122 controls the operation of the actuator 60 to place the detent member 66 in the parking lock position when the operation of the shifting device 46 to the parking position is detected by the shift position sensor 44. In the parking lock position of the detent member 66, the engaging tooth 90 of the parking lock pawl 86 is held in engagement with the external teeth 84 of the parking lock gear 82, so that the shift switching device 58 is placed in the parking lock position in which the rotary motion of the parking lock gear 82 is prevented. When the operation of the shifting device 46 to any non-parking position (any position other than the parking position) is detected by the shift position sensor 44, on the other hand, the parking lock control portion 122 controls the operation of the actuator 60 to place the detent member 66 in the non-parking-lock position. In the non-parking-lock position of the detent member 66, the engaging tooth 90 of the parking lock pawl 86 is not held in engagement with the external teeth 84 of the parking lock gear 82, so that the rotary motion of the parking lock gear 82 is not prevented (that is, is permitted).

The parking lock control portion 122 releases the parking lock gear 82 of the shift switching device 58 for permitting the rotary motion of the parking lock gear 82 while the first clutch in the form of the clutch CL2 is placed in its engaged state. Namely, the parking lock control portion 122 controls the operation of the actuator 60 to pivot the detent member 66 from the parking lock position to the non-parking-lock position while the clutch CL2 is placed in the engaged state. Preferably, the parking lock control portion 122 commands the clutch engagement control portion 112 to place the clutch CL2 in the engaged state, when the hybrid vehicle is held stationary with the shifting device 46 placed in the parking position. In this engaged state of the clutch CL2, the parking lock control portion 122 places the shift switching device 58 in the non-parking-lock position according to the operation of the shifting device 46 to the non-parking position. Preferably, the parking lock control portion 122 operates the electrically operated oil pump 56 to apply the hydraulic pressure to the clutch CL2 so that the clutch CL2 is brought into the engaged state.

Preferably, the parking lock control portion 122 releases the parking lock gear 82 of the shift switching device 58 for permitting the rotary motion of the parking lock gear 82 while the second clutch in the form of the clutch CL1 is placed in its engaged state. Namely, the parking lock control portion 122 controls the operation of the actuator 60 to pivot the detent member 66 from the parking lock position to the non-parking-lock position while the clutches CL1 and CL2 are placed in the engaged states. Preferably, the parking lock control portion 122 commands the clutch engagement control portion 112 to place the clutches CL1 and CL2 in the engaged states, when the hybrid vehicle is held stationary with the shifting device 46 placed in the parking position. In the engaged states of the clutches CL1 and CL2, the parking lock control portion 122 places the shift switching device 58 in the non-parking-lock position according to the operation of the shifting device 46 to the non-parking position. Preferably, the parking lock control portion 122 operates the electrically operated oil pump 56 to apply the hydraulic pressure to the clutches CL1 and CL2 so that the clutches CL1 and CL2 are brought into the engaged states.

Preferably, the parking lock control portion 122 releases the parking lock gear 82 of the shift switching device 58 for permitting the rotary motion of the parking lock gear 82 while the clutch CL0 is placed in its engaged state. Namely, the parking lock control portion 122 controls the operation of the actuator 60 to pivot the detent member 66 from the parking lock position to the non-parking-lock position while the clutches CL0 and CL2 are placed in the engaged states. Preferably, the parking lock control portion 122 commands the clutch engagement control portion 112 to place the clutches CL0 and CL2 in the engaged states, when the hybrid vehicle is held stationary with the shifting device 46 placed in the parking position. In the engaged states of the clutches CL0 and CL2, the parking lock control portion 122 places the shift switching device 58 in the non-parking-lock position according to the operation of the shifting device 46 to the non-parking position. Preferably, the parking lock control portion 122 operates the electrically operated oil pump 56 to apply the hydraulic pressure to the clutches CL0 and CL2 so that the clutches CL0 and CL2 are brought into the engaged states. Further preferably, the parking lock control portion 122 commands the clutch engagement control portion 112 to place the clutches CL0, CL1 and CL2 in the engaged states, and places the shift switching device 58 in the non-parking-lock position according to the operation of the shifting device 46 to the non-parking position, while the clutches CL0, CL1 and CL2 are placed in the engaged states.

Preferably, the parking lock control portion 122 releases the parking lock gear 82 of the shift switching device 58 for permitting the rotary motion of the parking lock gear 82 while at least one of the brakes BK1 and BK2 is placed in its engaged state. Namely, the parking lock control portion 122 controls the operation of the actuator 60 to pivot the detent member 66 from the parking lock position to the non-parking-lock position while the clutch CL2 and at least one of the brakes BK1 and BK2 are placed in the engaged states. Preferably, the parking lock control portion 122 commands the clutch engagement control portion 112 to place the clutch CL2 in the engaged state, and commands the brake engagement control portion 114 to place at least one of the brakes BK1 and BK2 in the engaged state, when the hybrid vehicle is held stationary with the shifting device 46 placed in the parking position. In the engaged states of the clutch CL2 and at least one of the brakes BK1 and BK2, the parking lock control portion 122 places the shift switching device 58 in the non-parking-lock position according to the operation of the shifting device 46 to the non-parking position. Preferably, the parking lock control portion 122 operates the electrically operated oil pump 56 to apply the hydraulic pressure to the clutch CL2 and at least one of the brakes BK1 and BK2, so that the clutch CL2 and at least one of the brakes BK1 and BK2 are brought into the engaged states.

A slope detecting portion 124 is configured to determine whether the hybrid vehicle provided with the drive system 10 is located on a slope or hill (uphill road). This determination is made on the basis of a longitudinal acceleration value (gravitational acceleration value) of the hybrid vehicle detected by a longitudinal acceleration sensor (not shown) provided in the drive system 10, or a gradient of a road surface detected by a gradient sensor (not shown) provided in the drive system 10. Preferably, the slope detecting portion 124 determines whether the hybrid vehicle is parked or held stationary on an uphill road while the vehicle running speed V detected by the output speed sensor 40 is zero.

Preferably, the parking lock control portion 122 commands the clutch engagement control portion 112 to place the clutch CL2 in the engaged state while the hybrid vehicle is held stationary with the shifting device 46 placed in the parking position and while the parking of the hybrid vehicle on a slope is detected by the slope detecting portion 124. In the engaged state of the clutch CL2, the parking lock control portion 122 places the shift switching device 58 in the non-parking-lock position according to the operation of the shifting device 46 to the non-parking position. Preferably, the parking lock control portion 122 commands the clutch engagement control portion 112 to place the clutches CL1 and CL2 in the engaged states, and places the shift switching device 58 in the non-parking-lock position according to the operation of the shifting device 46 to the non-parking position while the clutches CL1 and CL2 are placed in the engaged states. Preferably, the parking lock control portion 122 commands the clutch engagement control portion 112 to place the clutches CL0 and CL2 in the engaged states, and places the shift switching device 58 in the non-parking-lock position according to the operation of the shifting device 46 to the non-parking position while the clutches CL0 and CL2 are placed in the engaged states. Preferably, the parking lock control portion 122 commands the clutch engagement control portion 112 to place the clutch CL2 in the engaged state, and commands the brake engagement control portion 114 to place at least one of the brakes BK1 and BK2 in the engaged state, and places the shift switching device 58 in the non-parking-lock position according to the operation of the shifting device 46 to the non-parking position while the clutch CL2 and at least one of the brakes BK1 and BK2 are placed in the engaged states.

When a foot brake provided on the hybrid vehicle provided with the parking lock mechanism in the form of the shift switching device 58 of FIG. 3 incorporated in its transmission device is released after the manually operated shifting device 46 is operated to the parking position while the hybrid vehicle is held stationary on a slope (uphill road) with an operation of the foot brake, the engaging tooth 90 of the parking lock pawl 86 is stuck on the external teeth 84 of the parking lock gear 82. At this time, a drive shaft of the hybrid vehicle is subjected to a torsional force due to a weight of the hybrid vehicle parked on the slope. According to the prior art technique for returning the parking lock mechanism to the non-parking-lock position, a torsional energy is released or transmitted from the drive shaft in a direction toward an upstream portion of the drive system 10 in which the drive shaft is operatively connected to the rotor 24 of the second electric motor MG2. The torsional energy released from the drive shaft causes an abrupt rotary motion of the shaft of the rotor 24 of the second electric motor MG2 due to an amount of backlash of gears provided in the drive system 10. Since the rotor 24 of the second electric motor MG2 is a comparatively large inertial body having a comparatively large inertia, a comparatively large impact torque is transmitted to the shaft of the rotor 24 of the second electric motor MG2 upon stopping of rotary motions of the gears, giving rise to a risk of deterioration of durability of the drive system 10. According to the prior art technique, the pressurized oil is not normally supplied to the hydraulic control unit 54 while the hybrid vehicle is held stationary, so that the clutches CL0, CL1 and CL2 and brakes BK1 and BK2 are held in the released states. As a result, the ring gear R2 is freely rotated when the parking lock mechanism is brought into the non-parking-lock position, so that only the second electric motor MG2 receives the impact torque. To cope with this phenomenon, it is required to enforce the shaft of the rotor 24 of the second electric motor MG2, bearings for supporting this rotor shaft, and a housing structure of the second electric motor MG2.

The parking lock control portion 122 provided according to the present embodiment is configured to place the shift switching device 58 in the non-parking-lock position while at least the clutch CL2 is placed in the engaged state to connect the carrier C1 of the first planetary gear set 14 and the ring gear R2 of the second planetary gear set 16 via the clutch CL2. Preferably, the parking lock control portion 122 is configured to place the clutches CL0 and CL1 and at least one of the brakes BK1 and BK2 as well as the clutch CL2 in the engaged states before the shift switching device 58 is placed in the non-parking-lock position. Accordingly, the torsional energy released from the drive shaft is received by the first electric motor MG1, the engine 12, etc., as well as by the second electric motor MG2, so that the amount of impact torque transmitted to the second electric motor MG2 can be effectively reduced. In addition, the parking lock control portion 122 configured according to the present embodiment as described above eliminates a need of enforcing the rotor shaft of the second electric motor MG2, its support bearings, and the housing of the second electric motor MG2, whereby the cost of manufacture and the mass of the drive system 10 can be effectively reduced.

Figure 6:
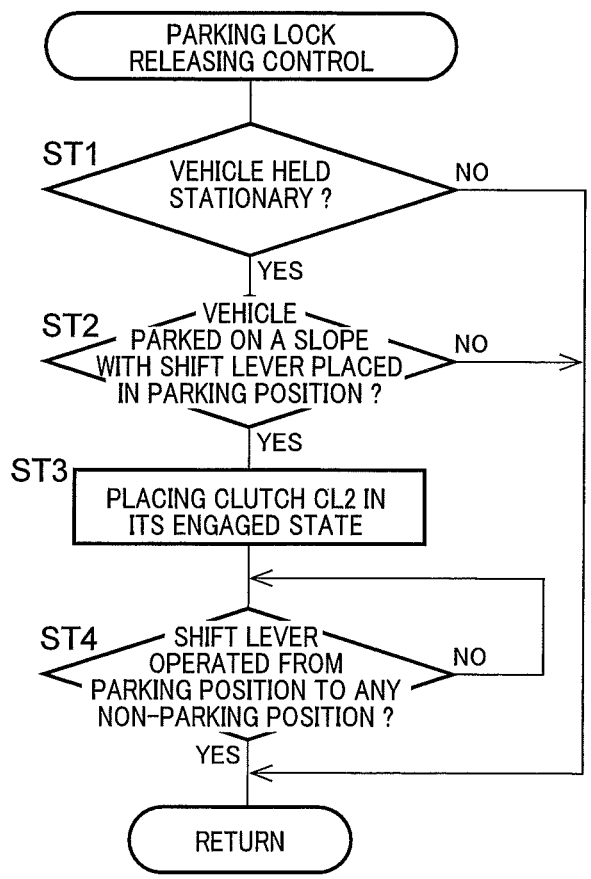
FIG. 6 is a flow chart illustrating a major portion of one example of a parking lock releasing control implemented by the electronic control device shown in FIG. 2.

FIG. 6 is the flow chart illustrating a major portion of one example of a parking lock releasing control implemented by the electronic control device 30. The parking lock releasing control is repeatedly implemented with a predetermined cycle time.

The parking lock releasing control is initiated with a step ST1 to determine whether the hybrid vehicle is held stationary. For instance, this determination is made by determining whether the vehicle running speed V detected by the output speed sensor 40 is zero. If a negative determination is obtained in the step ST1, the present control routine is terminated. If an affirmative determination is obtained in the step ST1, the control flow goes to a step ST2 to determine whether the hybrid vehicle is parked on a slope (uphill road) while the manually operated shifting device 46 is placed in the parking position. If a negative determination is obtained in the step ST2, the present control routine is terminated. If an affirmative determination is obtained in the step ST2, the control flow goes to a, step ST3 to operate the electrically operated oil pump 56 and to place at least the clutch CL2 in the engaged state with a hydraulic pressure being applied from the oil pump 56 to the clutch CL2. Preferably, the clutch CL1 is also placed in the engaged state. Preferably, the clutch CL0 is also placed in the engaged state. Preferably, at least one of the brakes BK1 and BK2 is also placed in the engaged state. Then, the control flow goes to a step ST4 to determine whether the shifting device 46 has been operated from the parking position to any non-parking position. The step ST4 is repeatedly implemented until an affirmative determination is obtained in this step ST4. Namely, the present control routine is terminated when the affirmative determination is obtained in the step ST4. It will be understood from the foregoing description of the parking lock releasing control that the step ST2 corresponds to an operation of the slope detecting portion 124, and the step ST3 corresponds to operations of the clutch engagement control portion 112 and the brake engagement control portion 114, while the step ST4 corresponds to the parking lock control portion 122.

As described above, the present embodiment is configured such that the parking lock control portion 122 releases the parking lock gear 82 of the parking lock mechanism in the form of the shift switching device 58 for permitting the rotary motion of the parking lock gear 82 while the first clutch in the form of the clutch CL2 is placed in its engaged state, whereby an impact torque generated upon releasing of the parking lock gear 82 is transmitted to the first planetary gear set 14, the engine 12, the first electric motor MG1, etc., as well as to the second electric motor MG2, so that an amount of the impact torque transmitted to the second electric motor MG2 can be effectively reduced. Namely, the present embodiment provides a control apparatus in the form of the electronic control device 30 for the hybrid vehicle drive system 10, which permits effective reduction of deterioration of durability of the drive hybrid vehicle drive system 10 due to the impact torque generated upon releasing of the parking lock gear 82 of its parking lock mechanism in the form of the shift switching device 58.

The present embodiment is further configured such that the hybrid vehicle drive system 10 includes the second clutch in the form of the clutch CL1 which is placed in its engaged state to hold constant the ratio of the output speed of the first planetary gear set 14 to the speed of the rotary motion received by the first planetary gear set 14 from the engine 12, and the parking lock control portion 122 releases the parking lock gear 82 of the shift switching device 58 for permitting the rotary motion of the parking lock gear 82 while the clutch CL1 is placed in its engaged state. Accordingly, the impact torque generated upon releasing of the parking lock gear 82 can be efficiently transmitted to the first planetary gear set 14, the engine 12, the first electric motor MG1, etc., as well as to the second electric motor MG2.

The present embodiment is also configured such that the hybrid vehicle drive system 10 further includes the brakes BK1 and BK2 configured to selectively connect respectively the first rotary element of the first planetary gear set 14 in the form of the ring gear R1 and the first rotary element of the second planetary gear set 16 in the form of the ring gear R2 to the stationary member in the form of the housing 26, and the parking lock control portion 122 releases the parking lock gear 82 of the shift switching device 58 for permitting the rotary motion of the parking lock gear 82 while at least one of the brakes BK1 and BK2 is placed in its engaged state. Accordingly, the impact torque generated upon releasing of the parking lock gear 82 can be efficiently transmitted to the first planetary gear set 14, the engine 12, the first electric motor MG1, etc., as well as to the second electric motor MG2.

Another preferred embodiment of the present invention will be described in detail by reference to the drawings. In the following description, the same reference signs will be used to identify the same elements in the different embodiments, which will not be described redundantly.

Second Embodiment

FIG. 7 is the schematic view showing an arrangement of another hybrid vehicle drive system 150 (hereinafter referred to simply as a "drive system 150") to which this invention is suitably applicable. In the present drive system 150, the rotor 20 of the first electric motor MG1 is fixed to the sun gear S1 of the first planetary gear set 14, and the crankshaft 12a of the engine 12 is fixed to the carrier C1 of the first planetary gear set 14. The ring gear R1 of the first planetary gear set 14 and the ring gear R2 of the second planetary gear set 16 are fixed to each other, while the rotor 24 of the second electric motor MG2 is fixed to the sun gear S2 of the second planetary gear set 16. The ring gear R1 of the first planetary gear set 14 and the ring gear R2 of the second planetary gear set 16 which are fixed to each other are fixed to the output rotary member in the form of the output gear 28. The carrier C1 of the first planetary gear set 14 and the carrier C2 of the second planetary gear set 16 are selectively connectable to each other through the clutch CL. The carrier C2 of the second planetary gear set 16 can be selectively fixed to the stationary member in the form of the housing 26 through the brake BK. Like the drive system 10, the drive system 150 is provided with the electronic control device 30, the manually operated shifting device 46, the electrically operated oil pump 56, the shift switching device 58, etc.

Each of the clutch CL and brake BK is preferably a hydraulically operated coupling device the operating state of which is controlled (which is engaged and released) according to the hydraulic pressure applied thereto from the hydraulic control unit 54. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from the electronic control device 30.

In the present embodiment, the clutch CL functions as a first clutch configured to selectively connect the rotary element of the first planetary gear set 14 in the form of the carrier C1 (connected to the engine 12) and the rotary element of the second planetary gear set 16 in the form of the carrier C2 to each other, and the brake BK functions as a brake configured to selectively connect the rotary element (elements) of the second planetary gear set 16 in the form of the carrier C2 (and the ring gear R2) to the stationary member in the form of the housing 26.

In the hybrid vehicle provided with the drive system 150 constructed as described above, one of the plurality of drive modes is selectively established according to the operating states of the engine 12 and the first and second electric motors MG1 and MG2, and the operating states of the clutch CL and brake BK. FIG. 8 is the table indicating combinations of the operating states of the clutch CL and brake BK, which correspond to the respective four drive modes of the drive system 150. In this table, "o" marks represent the engaged states of the clutch CL and brake BK while blanks represent their released states. Drive modes EV-1 and EV-2 indicated in FIG. 8 are EV drive modes in which the engine 12 is held at rest while at least one of the first and second electric motors MG1 and MG2 is used as a vehicle drive power source. Drive modes HV-1 and HV-2 are hybrid drive modes in which the engine 12 is operated as the vehicle drive power source while the first and second electric motors MG1 and MG2 are operated as needed to generate a vehicle drive force and/or an electric energy. In these hybrid drive modes, at least one of the first and second electric motors MG1 and MG2 may be operated to generate a reaction force or placed in a non-loaded free state.

As is apparent from FIG. 8, the EV drive modes of the drive system 150 in which the engine 12 is held at rest while at least one of the first and second electric motors MG1 and MG2 is used as the vehicle drive power source consist of: a mode 1 (drive mode 1) in the form of the drive mode EV-1 which is established in the engaged state of the brake BK and in the released state of the clutch CL; and a mode 2 (drive mode 2) in the form of the drive mode EV-2 which is established in the engaged states of both of the brake BK and clutch CL. The hybrid drive modes in which the engine 12 is operated as the vehicle drive power source while the first and second electric motors MG1 and MG2 are operated as needed to generate a vehicle drive force and/or an electric energy, consist of: a mode 3 (drive mode 3) in the form of the drive mode HV-1 which is established in the engaged state of the brake BK and in the released state of the clutch CL; and a mode 4 (drive mode 4) in the form of the drive mode HV-2 which is established in the released state of the brake BK and in the engaged state of the clutch CL.

In the drive mode EV-1 indicated in FIG. 8, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is fixed to the stationary member in the form of the housing 26, so that the rotating speed of the carrier C2 is held at zero. In this drive mode EV-1, the rotating directions of the sun gear S2 and the ring gear R2 in the second planetary gear set 16 are opposite to each other, so that the ring gear R2, that is, the output gear 28 is rotated in a positive direction by a negative torque (a torque in the negative direction) generated by the second electric motor MG2, namely, the hybrid vehicle provided with the drive system 150 is driven in the forward direction by the negative torque generated by the second electric motor MG2. In this case, the first electric motor MG1 is preferably placed in a free state. In this drive mode EV-1, the carriers C1 and C2 are permitted to be rotated relative to each other, so that the hybrid vehicle can be driven in the EV drive mode similar to an EV drive mode which is established in a vehicle provided with a so-called "THS" (Toyota Hybrid System) and in which the carrier C2 is fixed to the stationary member.

In the drive mode EV-2 indicated in FIG. 8, the carrier C1 of the first planetary gear set 14 and the carrier C2 of the second planetary gear set 16 are not rotatable relative to each other in the engaged state of the clutch CL. In the engaged state of the brake BK, the carrier C2 of the second planetary gear set 16 and the carrier C1 of the first planetary gear set 14 which are connected to each other are fixed to the stationary member in the form of the housing 26, so that the rotating speeds of the carriers C1 and C2 are held at zero. In this drive mode EV-2, the rotating directions of the sun gear S1 and the ring gear R1 in the first planetary gear set 14 are opposite to each other, and the rotating directions of the sun gear S2 and the ring gear R2 in the second planetary gear set 16 are opposite to each other. Namely, the ring gears R1 and R2, that is, the output gear 28 is rotated in the positive direction by a negative torque (a torque in the negative direction) generated by the first electric motor MG1 or the second electric motor MG2, that is, the hybrid vehicle provided with the drive system 150 is driven in the forward direction by the negative torque generated by at least one of the first and second electric motors MG1 and MG2.

In the drive mode HV-1 indicated in FIG. 8, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is fixed to the stationary member in the form of the housing 26, so that the rotating speed of the carrier C2 is held at zero. In this drive mode HV-1, the engine 12 is operated, and the output gear 28 is rotated by an output torque of the engine 12. In this case, the first electric motor MG1 is operated to generate a reaction torque, to permit the output of the engine 12 to be transmitted to the output gear 28 in the first planetary gear set 14. In the engaged state of the brake BK, the rotating directions of the sun gear S2 and the ring gear R2 in the second planetary gear set 16 are opposite to each other, namely, the ring gears R1 and R2, that is, the output gear 28 is rotated in the positive direction by a negative torque (a torque in the negative direction) generated by the second electric motor MG2.

In the drive mode HV-2 indicated in FIG. 8, the carrier C1 of the first planetary gear set 14 and the carrier C2 of the second planetary gear set 16 are not rotatable relative to each other due to the engaged state of the clutch CL, so that the carrier C1 and C2 serve as a single rotary component. The ring gears R1 and R2 which are fixed to each other serve as a single rotary component. That is, the first and second planetary gear sets 14 and 16 cooperate to function as a differential device having four rotary components when the drive system 150 is placed in the drive mode HV-2.

A clutch engagement control portion 112 comprised in the electronic control device 30 of the hybrid vehicle drive system 100 of the present embodiment is configured to control the operating states of the clutches CL1, CL2, etc. through the hydraulic control unit 54. Described more specifically, the clutch engagement control portion 112 controls an output hydraulic pressure of a solenoid control valve provided in the hydraulic control unit 54 to control the clutch CL, for controlling the hydraulic pressure $P_{CL}$ which determines the operating state (torque capacity) of the clutch CL. The brake engagement control portion 114 controls the operating state of the brake BK through the hydraulic control unit 54. Described more specifically, the brake engagement control portion 114 controls an output hydraulic pressure of a solenoid control valve provided in the hydraulic control unit 54 to control the brake BK, for controlling the hydraulic pressure $P_{BK}$ which determines the operating state (torque capacity) of the brake BK.

The parking lock control portion 122 releases the parking lock gear 82 of the shift switching device 58 for permitting the rotary motion of the parking lock gear 82 while the clutch CL is placed in its engaged state. Namely, the parking lock control portion 122 controls the operation of the actuator 60 to pivot the detent member 66 from the parking lock position to the non-parking-lock position while the clutch CL is placed in the engaged state. Preferably, the parking lock control portion 122 commands the clutch engagement control portion 112 to place the clutch CL in the engaged state, when the hybrid vehicle is held stationary with the shifting device 46 placed in the parking position. In this engaged state of the clutch CL, the parking lock control portion 122 places the shift switching device 58 in the non-parking-lock position according to the operation of the shifting device 46 to the non-parking-lock position. Preferably, the parking lock control portion 122 operates the electrically operated oil pump 56 to apply the hydraulic pressure to the clutch CL so that the clutch CL is brought into the engaged state.

Preferably, the parking lock control portion 122 releases the parking lock gear 82 of the shift switching device 58 for permitting the rotary motion of the parking lock gear 82 while the brake BK is placed in its engaged state. Namely, the parking lock control portion 122 controls the operation of the actuator 60 to pivot the detent member 66 from the parking lock position to the non-parking-lock position while the clutch CL and the brake BK are placed in the engaged state. Preferably, the parking lock control portion 122 commands the clutch engagement control portion 112 to place the clutch CL in the engaged state, and commands the brake engagement control portion 114 to place the brake BK in the engaged state, when the hybrid vehicle is held stationary with the shifting device 46 placed in the parking position. In the engaged states of the clutch CL and the brake BK, the parking lock control portion 122 places the shift switching device 58 in the non-parking-lock position according to the operation of the shifting device 46 to the non-parking position. Preferably, the parking lock control portion 122 operates the electrically operated oil pump 56 to apply the hydraulic pressure to the clutch CL and the brake BK, so that the clutch CL and the brake BK are brought into the engaged states.

Preferably, the parking lock control portion 122 commands the clutch engagement control portion 112 to place the clutch CL in the engaged state while the hybrid vehicle is held stationary with the shifting device 46 placed in the parking position and while the parking of the hybrid vehicle on a slope is detected by the slope detecting portion 124. In the engaged state of the clutch CL, the parking lock control portion 122 places the shift switching device 58 in the non-parking-lock position according to the operation of the shifting device 46 to the non-parking position. Preferably, the parking lock control portion 122 commands the clutch engagement control portion 112 and the brake engagement control portion 114 to place the clutch CL in the engaged state and the brake BK in the engaged state, respectively, and places the shift switching device 58 in the non-parking-lock position according to the operation of the shifting device 46 to the non-parking position while the clutch CL is placed in the engaged state by the clutch engagement control portion 112 and the brake BK is placed in the engaged state by the brake engagement control portion 114.

As described above, the present second embodiment is configured such that the parking lock control portion 122 releases the parking lock gear 82 of the parking lock mechanism in the form of the shift switching device 58 for permitting the rotary motion of the parking lock gear 82 while the first clutch in the form of the clutch CL is placed in its engaged state, whereby an impact torque generated upon releasing of the parking lock gear 82 is transmitted to the first planetary gear set 14, the engine 12, the first electric motor MG1, etc., as well as to the second electric motor MG2, so that an amount of the impact torque transmitted to the second electric motor MG2 can be effectively reduced. Namely, the present embodiment provides a control apparatus in the form of the electronic control device 30 for the hybrid vehicle drive system 150, which permits effective reduction of deterioration of durability of the hybrid vehicle drive system 150 due to the impact torque generated upon releasing of the parking lock gear 82 of its parking lock mechanism in the form of the shift switching device 58.

The present embodiment is also configured such that the hybrid vehicle drive system 150 further includes the brake BK configured to selectively connect the rotary element of the first planetary gear set 14 in the form of the ring gear R1 to the stationary member in the form of the housing 26, and the parking lock control portion 122 releases the parking lock gear 82 of the shift switching device 58 for permitting the rotary motion of the parking lock gear 82 while the brake BK is placed in its engaged state. Accordingly, the impact torque generated upon releasing of the parking lock gear 82 can be efficiently transmitted to the first planetary gear set 14, the engine 12, the first electric motor MG1, etc., as well as to the second electric motor MG2.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS 10, 150: Hybrid vehicle drive system
12: Engine
14: First planetary gear set (First differential mechanism)
16: Second planetary gear set (Second differential mechanism)
26: Housing (Stationary member)
28: Output gear (Output rotary member)
30: Electronic control device
46: Manually operated shifting device
58: Shift switching device (Parking lock mechanism)
82: Parking lock gear
BK: Brake
BK1: Brake
BK2: Brake
C1: Carrier (Second rotary element)
C2: Carrier (Second rotary element)
CL: Clutch (Second clutch)
CL2: Clutch (First clutch)
R1: Ring gear (First rotary element)
R2: Ring gear (Second rotary element)
S1: (Third rotary element)
S2: (Third rotary element)
MG1: First electric motor
MG2: Second electric motor

The invention claimed is:

1. A control apparatus for a hybrid vehicle drive system including:
    a first differential mechanism provided with (1) a first rotary element of the first differential mechanism, the first rotary element of the first differential mechanism connected to an engine and (2) a second rotary element of the first differential mechanism, the second rotary element of the first differential mechanism connected to a first electric motor;
    a second differential mechanism provided with (1) a first rotary element of the second differential mechanism, the first rotary element of the second differential mechanism connected to a second electric motor and (2) a second rotary element of the second differential mechanism, the second rotary element of the second differential mechanism connected to an output rotary member;
    a first clutch configured to selectively connect the first rotary element of the first differential mechanism connected to the engine or the second rotary element of the first differential mechanism connected to the first electric motor, to the second rotary element of the second differential mechanism connected to the output rotary member;
    a manually operated shifting device; and
    a parking lock mechanism provided with a parking lock gear which is fixed to the output rotary member and a rotary motion of which is prevented when the shifting device is placed in a parking position, the control apparatus comprising:
    a parking lock control portion configured to release the parking lock gear for permitting the rotary motion of the parking lock gear while the first clutch is placed in its engaged state.

2. The control apparatus according to claim 1, wherein the hybrid vehicle drive system further includes a second clutch which is placed in its engaged state to hold constant a ratio of an output speed of the first differential mechanism to a speed of a rotary motion received by the first differential mechanism from said engine,
    and wherein the parking lock control portion releases the parking lock gear for permitting the rotary motion of the parking lock gear while the second clutch is placed in its engaged state.

3. The control apparatus according to claim 1, wherein the hybrid vehicle drive system further includes a brake configured to selectively connect the second rotary element of the first differential mechanism connected to the first electric motor or the second rotary element of the second differential mechanism connected to the output rotary member to a stationary member, and
    wherein the parking lock control portion releases the parking lock gear for permitting the rotary motion of the parking lock gear while the brake is placed in its engaged state.

4. The control apparatus according to claim 1, wherein the parking lock mechanism prevents a rotary motion of the output rotary member.

* * * * *